(12) United States Patent
Maekawa

(10) Patent No.: US 11,629,783 B2
(45) Date of Patent: Apr. 18, 2023

(54) SEAL RING AND SEALING STRUCTURE

(71) Applicant: NOK CORPORATION, Tokyo (JP)

(72) Inventor: Hirokazu Maekawa, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 229 days.

(21) Appl. No.: 16/765,263

(22) PCT Filed: Apr. 17, 2019

(86) PCT No.: PCT/JP2019/016551
§ 371 (c)(1),
(2) Date: May 19, 2020

(87) PCT Pub. No.: WO2019/230238
PCT Pub. Date: Dec. 5, 2019

(65) Prior Publication Data
US 2020/0370649 A1      Nov. 26, 2020

(30) Foreign Application Priority Data

May 30, 2018 (JP) .............................. JP2018-103486

(51) Int. Cl.
*F16J 15/06*        (2006.01)
(52) U.S. Cl.
CPC ..................... *F16J 15/06* (2013.01)
(58) Field of Classification Search
CPC ....................................................... F16J 15/06
See application file for complete search history.

(56) References Cited

U.S. PATENT DOCUMENTS 1,534,198 A * 4/1925 Wilson ...................... F16J 9/20
                                                        277/460
2,474,132 A * 6/1949 Sergius .................... F16J 15/32
                                                        277/452
(Continued)

FOREIGN PATENT DOCUMENTS

CA        2029246 A1 *  8/1991  .......... F16J 15/3284
CN      102252093 A  * 11/2011  .............. F15B 15/14
(Continued)

OTHER PUBLICATIONS

Extended European Search Report issued in EP application No. 19812512.2, dated Jan. 31, 2022.
(Continued)

*Primary Examiner* — Vishal A Patel
(74) *Attorney, Agent, or Firm* — Greenblum & Bernstein, P.L.C.

(57) ABSTRACT

A seal ring is an annular seal ring which is configured to be interposed between first and second members, and seals a gap between the first and second members. The second member is inserted into the first member, and reciprocates in its axial direction with respect to the first member. The seal ring includes an annular base part, an annular innermost end part, and a widening protrusion part. The annular base part has a radially exterior end to contact the first member. The annular innermost end part is integrally formed with a radially interior end of the base part to contact the second member. The widening protrusion part is integrally formed with the innermost end part, and protrudes with respect to the base part in the axial direction of the second member.

3 Claims, 4 Drawing Sheets

(56) References Cited

U.S. PATENT DOCUMENTS

| | | | | |
|---|---|---|---|---|
| 2,862,736 | A | * | 12/1958 | Russell .................. F16J 15/166 |
| | | | | 277/455 |
| 3,563,442 | A | * | 2/1971 | Kretchman .......... F16J 15/3236 |
| | | | | 277/455 |
| 3,921,988 | A | * | 11/1975 | Prasse ........................ F16J 9/28 |
| | | | | 277/944 |
| 4,163,544 | A | * | 8/1979 | Fowler .................. F16K 5/0673 |
| | | | | 251/315.08 |
| 4,305,593 | A | | 12/1981 | Smith |
| 4,776,599 | A | * | 10/1988 | Vezirian .................. E21B 10/25 |
| | | | | 175/371 |
| 5,050,892 | A | * | 9/1991 | Kawai .................. F04B 39/042 |
| | | | | 277/436 |
| 9,316,317 | B2 | * | 4/2016 | Okamura ............. F16J 15/3268 |
| 2010/0192766 | A1 | | 8/2010 | Minoguchi et al. |
| 2012/0091664 | A1 | | 4/2012 | Okamura et al. |
| 2016/0123469 | A1 | | 5/2016 | Perry |
| 2019/0049015 | A1 | * | 2/2019 | Mackel .................. F16J 15/106 |

FOREIGN PATENT DOCUMENTS

| | | | | |
|---|---|---|---|---|
| CN | 102410372 | A | | 4/2012 |
| GB | 1601130 | A | * | 10/1981 ............... F16K 1/34 |
| JP | 1-180062 | U | | 12/1989 |
| JP | 5-83538 | U | | 11/1993 |
| JP | 9-14451 | A | | 1/1997 |
| JP | 2000-136876 | A | | 5/2000 |
| JP | 2007-90198 | A | | 4/2007 |
| JP | 2012-63003 | A | | 3/2012 |
| WO | WO-2010015438 | A1 | * | 2/2010 ............. F16J 15/164 |

OTHER PUBLICATIONS

International Search Report issued in International Bureau of WIPO Patent Application No. PCT/JP2019/016551, dated May 21, 2019.

* cited by examiner

SEAL RING AND SEALING STRUCTURE

FIELD

The present invention relates to a seal ring and a sealing structure.

BACKGROUND

Shafts that are coupled to a pulley or a piston ring of, e.g., a car reciprocate in its axial direction. Onto a peripheral surface of such a shaft, high-pressure hydraulic fluid is supplied. To prevent leakage of high-pressure hydraulic fluid, a seal ring is arranged between the shaft and its housing (see Japanese Laid-Open Patent Publication No. JP H05-83538 U, for example).

BRIEF SUMMARY

Technical Problem

A load of the high-pressure hydraulic fluid is applied to the seal ring. In addition, another load is applied to the seal ring when the shaft slides on its casing. Because axial forces which are produced by hydraulic pressure and sliding are applied to the seal ring, the seal ring may deteriorate. If a seal ring is given improved durability under such environments, the seal ring can have a long life or be used under tougher environments.

It is an object of the present invention to improve durability of a seal ring even under environments in which the seal ring slides and is supplied with high-pressure hydraulic fluid.

Solution to Problem

A seal ring according to the present invention is an annular seal ring which is configured to be interposed between a first member and a second member that is inserted into the first member and reciprocates in its axial direction with respect to the first member, and to seal a gap between the first and second members, the seal ring including:

an annular base part that has a radially exterior end to contact the first member;

an annular innermost end part that is integrally formed with a radially interior end of the base part to contact the second member; and a widening protrusion part that is integrally formed with the innermost end part and protrudes with respect to the base part in the axial direction of the second member.

Also, a sealing structure according to the present invention includes a first member that includes a groove main part and a stepped part;

a second member that is inserted into the first member and reciprocates in its axial direction with respect to the first member; and an annular seal ring that is interposed between the first and second members and seals a gap between the first and second members, the seal ring including an annular base part that has a radially exterior end to contact the first member;

an annular innermost end part that is integrally formed with a radially interior end of the base part to contact the second member; and a widening protrusion part that is integrally formed with the innermost end part and protrudes with respect to the base part in the axial direction of the second member to be arranged on the stepped part, the widening protrusion part having a length in the axial direction of the second member shorter than the length of the stepped part.

Advantageous Effects

According to the present invention, durability of a seal ring can be improved even under environments in which the seal ring slides and is supplied with high-pressure hydraulic fluid.

DETAILED DESCRIPTION

The following description will describe seal rings according to embodiments with reference to drawings. It should be noted that the present invention is not limited to the embodiments. In addition, elements in the embodiments can include an element which is known by a person skilled in the art as the element interchangeable or easily interchangeable from the elements in the embodiments, or an element which is substantially the same as the elements in the embodiments.

First Embodiment

Figure 1:
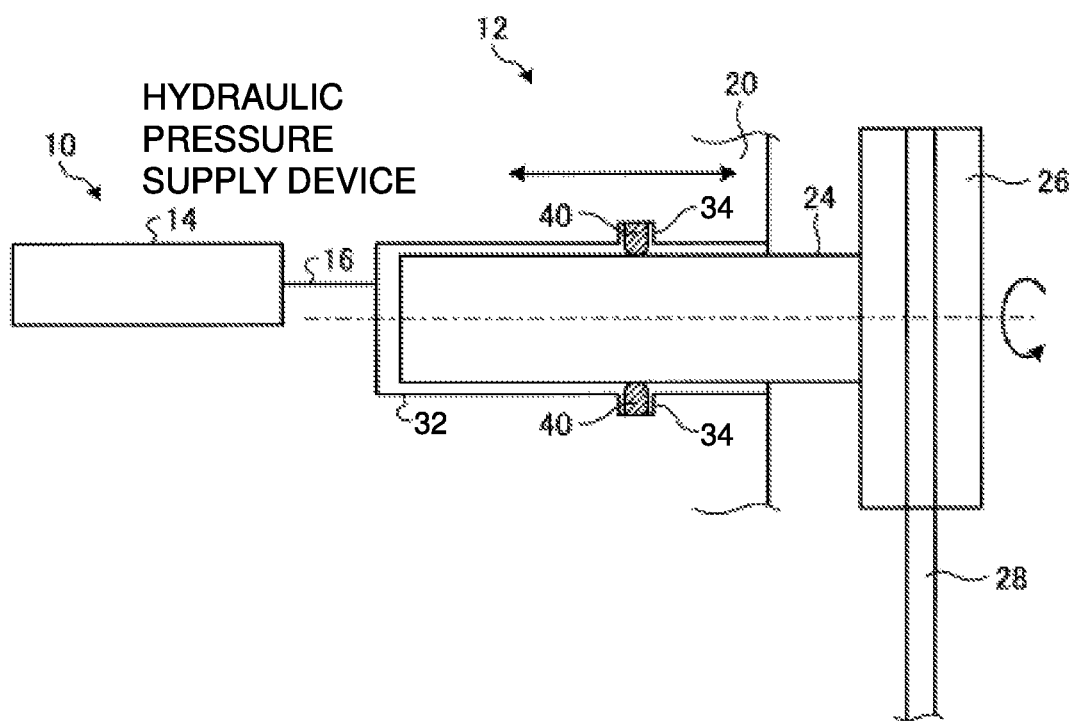
FIG. 1 is a perspective view showing an exemplary reciprocating machine which includes a seal ring according to a first embodiment.

FIG. 1 is a perspective view showing an exemplary rotating machine which includes a seal ring according to a first embodiment. The reciprocating machine 10 shown in FIG. 1 is a part of CVT (Continuously Variable Transmission). Specifically, the reciprocating machine is a primary or secondary pulley of CVT. The reciprocating machine 10 includes a machine main body 12, a hydraulic pressure supply device 14, and piping 16. The hydraulic pressure supply device 14 supplies pressurized hydraulic fluid to the machine main body 12. The hydraulic fluid flows through the piping 16. The hydraulic pressure supply device 14 and the machine main body 12 are connected by the piping 16 to each other.

The machine main body 12 rotably supports a pulley 26. A belt 28 of CVT rotates about the pulley 26. The machine main body 12 includes a casing (first member) 20, a rotation shaft (second member) 24, the pulley 26, the belt 28, and a seal ring 40.

A cylinder 32 and a seal groove 34 are formed in the casing 20. The rotation shaft 24 is inserted into the cylinder 32. The cylinder 32 is a cylindrical space which has an open end on one end of the cylindrical shape and a closed end on another end. The piping 16 is connected to the closed end of the cylinder 32. The hydraulic fluid is supplied to the cylinder 32 from the hydraulic pressure supply device 14. The seal groove 34 is formed in the inner peripheral surface of the cylinder 32. The seal ring 40 is arranged in the seal groove 34. The shape of the seal groove 34 will be discussed later. Although the casing 20 is shown as a simple component for ease of understanding of its function in this embodiment, the casing 20 may have a shape which surrounds the outer peripheries of the pulley 26 and the belt 28.

The rotation shaft 24 is supported movably in its axial direction and rotably in its circumferential direction by the cylinder 32. The rotation shaft 24 partially protrudes from the cylinder 32. Although not illustrated in this embodiment, the rotation shaft 24 is directly or indirectly connected to a driving portion which rotates the rotation shaft 24 or a movable portion which transmits rotation to the rotation shaft 24. The pulley 26 is fastened to an end of the rotation shaft 24 that protrudes from the cylinder 32. The pulley 26 rotates together with the rotation shaft 24. The belt 28 is wound around the pulley 26. The belt 28 is also wound around other pulleys to transmit rotation of the pulley 26 to these other pulleys.

The seal ring 40 has an annular shape, and is inserted into the seal groove 34. The seal ring 40 seals a gap between the casing 20 and the rotation shaft 24. Specifically, the seal ring 40 seals against leakage of the hydraulic fluid which is supplied to a space between the rotation shaft 24 and the casing 20 from the hydraulic pressure supply device 14.

Figure 2:
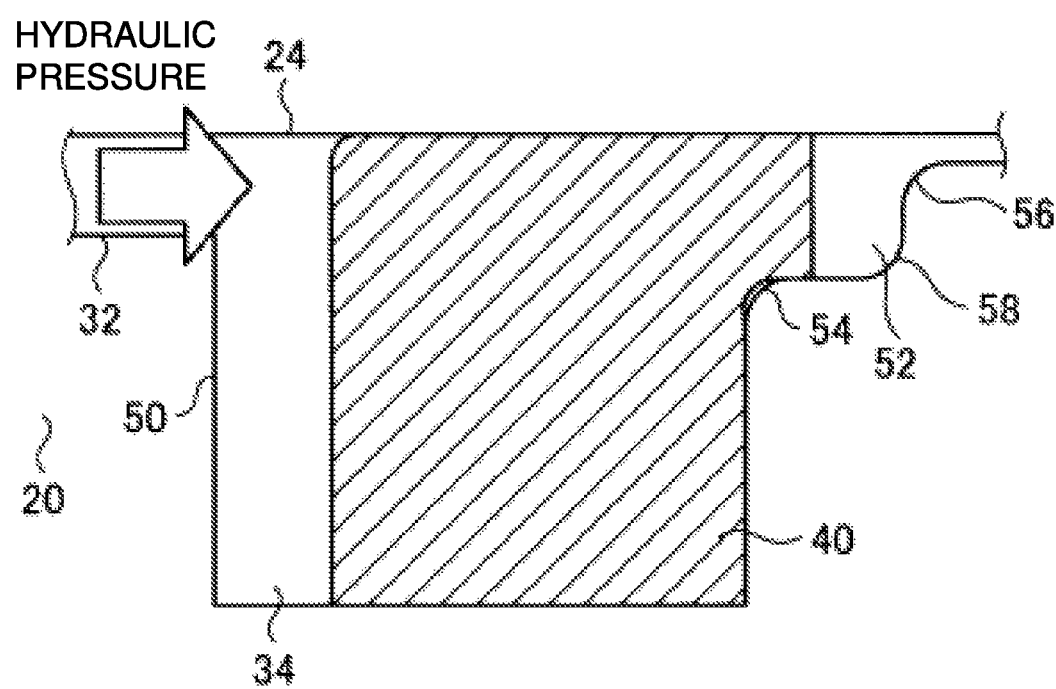
FIG. 2 is a cross-sectional view showing the seal ring shown in FIG. 1.
Figure 3:
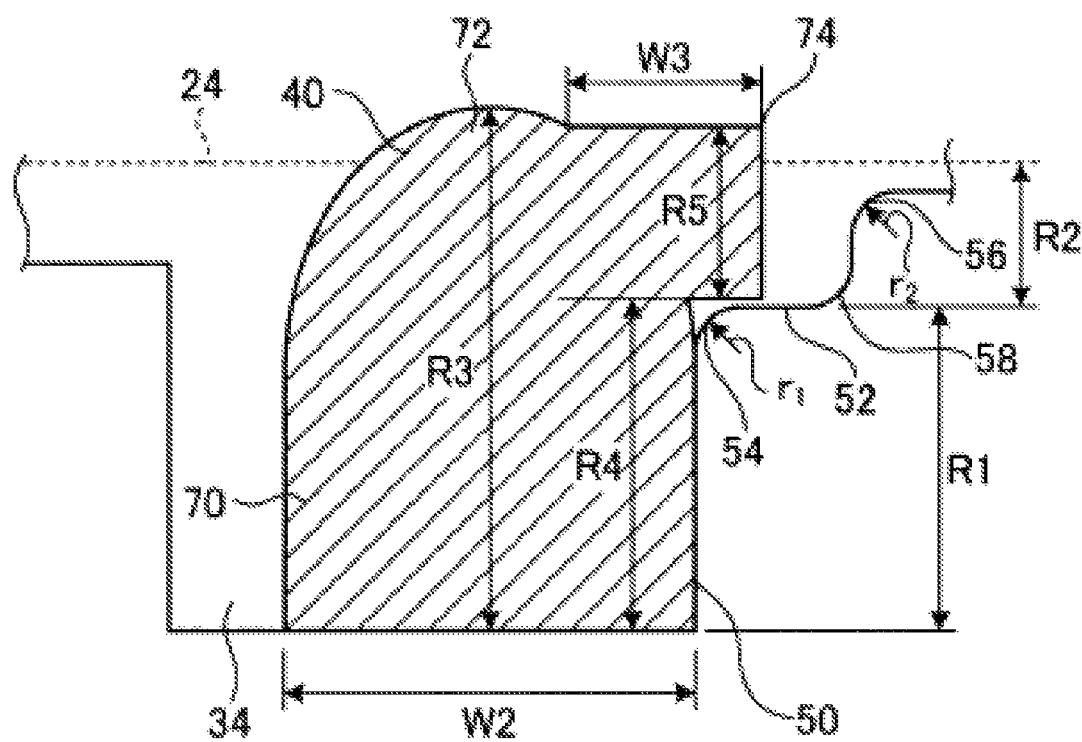
FIG. 3 is a cross-sectional view schematically showing the seal ring.

The seal groove 34 and the seal ring 40 are now described with reference to FIGS. 2 and 3. FIG. 2 is a cross-sectional view showing the seal ring shown in FIG. 1. FIG. 3 is a cross-sectional view schematically showing the seal ring. The seal ring 40 shown in FIG. 2 is compressed by the casing 20 and the rotation shaft 24. The seal ring 40 shown in FIG. 3 is attached to the casing 20, and is not compressed by the rotation shaft 24.

The seal groove 34 has a groove main part 50 and a stepped part 52. The groove main part 50 accommodates the seal ring 40. The stepped part 52 according to this embodiment is formed on the open end side of the cylinder 32. The stepped part 52 has a depth smaller than the groove main part 50 in the radial direction (the radial direction of the rotation shaft 24). A first inside-groove rounded part 54 is formed between the stepped part 52 and the groove main part 50. A second inside-groove rounded part 56 is formed between the stepped part 52 and the inner peripheral surface of the cylinder 32. A third inside-groove rounded part 58 is formed in a corner of the stepped part 52. The first inside-groove rounded part 54 is a curved surface having a convex shape which bulges toward the center axial of the rotation shaft 24 and has a radius r1 as viewed in a section. The second inside-groove rounded part 56 is a curved surface having a convex shape which bulges toward the center axial of the rotation shaft 24 and has a radius r2 as viewed in a section. The third inside-groove rounded part 58 is a curved surface having a concave shape which is concave toward the center axial of the rotation shaft 24. A distance between a bottom surface (surface on the radially exterior side) of the stepped part 52 and a bottom surface (surface on the radially exterior side) of the groove main part 50 is defined as R1. Also, a distance between a bottom surface of the stepped part 52 and a surface of the rotation shaft 24 is defined as R2.

The seal ring 40 is arranged in the groove main part 50 and the stepped part 52 of the seal groove 34, and seals a gap between the casing 20 and the rotation shaft 24. The seal ring 40 is an annular ring. The seal ring 40 can be formed of rubber such as nitrile rubber, acrylic rubber, EPDM (ethylene propylene diene rubber), CR (polychloroprene rubber), silicone rubber, fluorocarbon rubber, and natural rubber, for example.

The seal ring 40 includes a base part 70, an innermost end part 72, and a widening protrusion part 74 as viewed in a section. The base part 70, the innermost end part 72, and the widening protrusion part 74 are integrally formed with each other as a unitary component. The base part 70 has a rectangular shape as viewed in a section, and is arranged in the groove main part 50. The base part 70 contacts the casing 20. The innermost end part 72 is arranged on the radially interior side of the base part 70. A radially exterior end of the innermost end part 72 is coupled to a radially interior end of the base part 70. The innermost end part 72 has an oval shape which bulges toward the rotation shaft 24 as viewed in a section. The innermost end part 72 contacts the rotation shaft 24. The base part 70 and the innermost end part 72 are integrally formed to have a D shape. The widening protrusion part 74 is formed on the innermost end part 72 on the open end side of the cylinder 32, and protrudes with respect to the base part 70 in the axial direction of the rotation shaft 24. The widening protrusion part 74 is partially arranged in the stepped part 52.

The seal ring 40 has a length R3 in the radial direction as shown in FIG. 3. A distance from the radially exterior end of the base part 70 to the radially exterior end of the widening protrusion part 74 is defined as R4. The widening protrusion part 74 has a length R5 in the radial direction. Also, the base part 70 has a length (width) W2 in the axial direction. A length (width) of the widening protrusion part 74 in the axial direction is defined as W3.

The seal ring 40 sealingly separates a space between the groove main part 50 of the seal groove 34 and the rotation shaft 24 from a space between the stepped part 52 and the rotation shaft 24, as shown in FIG. 2, and seals a gap between the casing 20 and the rotation shaft 24 even when a pressure of the space between the groove main part 50 of the seal groove 34 and the rotation shaft 24 is increased by a hydraulic pressure of the hydraulic fluid which is supplied from the closed end of the cylinder 32, and becomes high.

Because the seal ring 40 includes the widening protrusion part 74, the widening protrusion part 74 will be brought in contact with the stepped part 52. According to this arrangement, deformation of the base part 70 and the innermost end part 72 is reduced. As a result, distortion of the seal ring 40 can be reduced. That is, even when an axial force is applied to the seal ring 40 by a press force of high-pressure hydraulic fluid or relative axial movement between the rotation shaft 24 and the casing 20, deformation of the seal ring 40 which pushes the base part 70 and the innermost end part 72 toward a gap between the casing 20 and the rotation shaft 24 can be reduced. Therefore, a large distortion can be prevented. Consequently, the seal ring 40 is given improved durability. The seal ring 40 which is a rubber-only seal component can be used in parts in which slide movement is performed under high pressure. For example, even under environments in which axial slide movement is performed under pressure 3.2 MPa or more, and packings constructed of high strength O ring and back-up ring (made of PTFE (polytetrafluoroethylene)) or seal rings constructed of a packing and a slide member have been used, and other such environments, the seal ring 40 can have high durability.

In addition, because the stepped part 52 is formed in the seal groove 34, the seal ring 40 is unlikely to be pushed into a narrow space between the cylinder 32 and the rotation shaft 24. For this reason, distortion which may occur in the seal ring 40 can be small. Therefore, the wearing out of the seal ring 40 can be reduced.

The radius r1 of the first inside-groove rounded part 54 is preferably falls within a range not smaller than 0.2 mm and not greater than 0.4 mm. In this range, distortion of the seal ring 40 can be reduced.

Here, the distance R3 is preferably not greater 1.5 times the distance R1. In this case, tilting of the seal ring 40 can be reduced. A ratio of the distance R3 to the width W2 is preferably not smaller than 1.5 and not greater than 2.0. In the case in which the ratio is not smaller than 1.5, tilting of the seal ring 40 can be reduced. In the case in which the ratio is not greater than 2.0, buckling of the seal ring 40 can be prevented. The distance R5 is preferably similar to the distance R2. The distance R4 is preferably similar to the distance R1. In these conditions, the seal ring 40 can be properly attached in the groove main part 50 and the stepped part 52.

Second Embodiment

Figure 4:
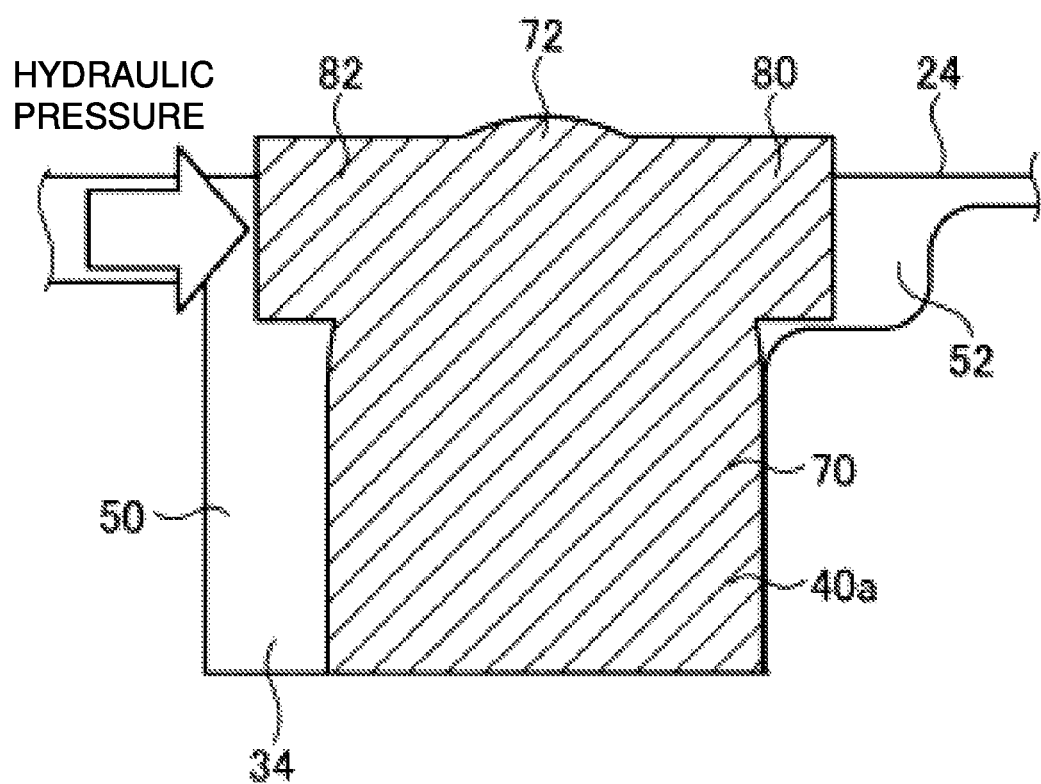
FIG. 4 is a cross-sectional view schematically showing a seal ring according to a second embodiment.

FIG. 4 is a cross-sectional view schematically showing a seal ring according to a second embodiment. The seal ring 40a according to this embodiment includes a base part 70, an innermost end part 72, a first widening protrusion parts 80, and a second widening protrusion part 82. The base part 70, the innermost end part 72, and the first and second widening protrusion parts 80 and 82 are integrally formed with each other as a unitary component. The base part 70 and the innermost end part 72 according to this embodiment have a structure similarly to the seal ring 40 according to the first embodiment. The first widening protrusion part 80 is formed on the innermost end part 72 on the open end side of the cylinder 32, and protrudes with respect to the base part 70 in the axial direction of the rotation shaft 24. The second widening protrusion part 82 is formed on the innermost end part 72 on the closed end side of the cylinder 32, and protrudes with respect to the base part 70 in the axial direction of the rotation shaft 24.

Because the seal ring 40a according to this embodiment includes the first and second widening protrusion parts 80 and 82 which are arranged on the both axial ends of the innermost end part 72, the seal ring 40a has a symmetrical shape. For this reason, this seal ring can work irrespective of its orientation. Therefore, this seal ring can be used in various types of devices without concern for orientation.

Although the seal ring 40 has been described to be attached to the rotation shaft 24 which is rotated by the belt 28 in the reciprocating machine 10 according to the foregoing embodiment, a shaft which holds the seal ring 40 is not limited to this. The seal ring according to this embodiment can be used in any mechanism that is supplied with hydraulic fluid and includes a shaft which slides in it axial direction. For example, the seal ring can be used in space between the piston and the cylinder, that is, as a piston ring.

Although the seal ring according to this embodiment has been described as a D ring which includes the base part having a sectionally rectangular shape, the seal ring can be an oval ring which includes a base part having sectionally semi-oval shape and the innermost end part so that the sectionally semi-oval base part and the innermost end part form an oval shape.

REFERENCE SIGNS LIST

10 . . . Reciprocating Machine
12 . . . Machine Main Body
14 . . . Hydraulic Pressure Supply Device
16 . . . Piping
20 . . . Casing (First Member)
24 . . . Rotation Shaft (Second Member)
26 . . . Pulley
28 . . . Belt
32 . . . Cylinder
34 . . . Seal Groove
40 . . . Seal Ring
50 . . . Groove Main Part
52 . . . Stepped Part
54 . . . First Inside-Groove Rounded Part
56 . . . Second Inside-Groove Rounded Part
58 . . . Third Inside-Groove Rounded Part
70 . . . Base Part
72 . . . Innermost End Part
74 . . . Widening Protrusion Part
r1, r2 . . . Radius
R1, R2, R3, R4, R5 . . . Distance
W2, W3 . . . Width

The invention claimed is:

1. A sealing structure comprising:
a first member including an opening defined by a cylindrical shaped surface,
an annular seal groove formed in the cylindrical shaped surface, wherein the annular seal groove has a groove main part and a stepped part;
a second member inserted into the opening of the first member, wherein the second member is supported in a manner movable in an axial direction and rotatable in a circumferential direction;
a monolithic annular seal ring interposed between the first member and the second member to seal a gap between the first member and second member;
the monolithic annular seal ring comprising:
an annular base part having a radially exterior end defined by an annular contact surface that contacts an opposing surface of the groove main part, the annular base part having a rectangular cross section;
an annular innermost end part that is integrally formed with a radially interior end of the annular base part to contact the second member;
the annular innermost end part having a curve with an apex that coincides with an axial center of the annular contact surface; and
a widening protrusion part having a rectangular cross section and the widening protrusion part is integrally formed with the innermost end part and protrudes with respect to the base part in the axial direction so as to be positioned within a recess defined by the stepped part,
wherein a height of the widening protrusion part is greater than a distance between a surface of the stepped part and an exterior surface of the second member,
the widening protrusion part has a length in the axial direction that is shorter than a length of the stepped part in the axial direction, and wherein
a length in the axial direction from an outermost end of the widening protrusion part to the curve of the annular innermost end part is greater than a length in the axial direction from the outermost end of the widening protrusion part to a side surface of the rectangular cross section of the annular base part that intersects the widening protrusion part.

2. The seal structure according to claim 1,
further comprising an opposing protruding part that is integrally formed with an opposing end of the annular innermost end part so as to be opposite the widening protrusion part in the axial direction.

3. The sealing structure according to claim 2, wherein the widening protrusion part and the opposing protruding part extend symmetrically from the annular innermost end part in the axial direction.

* * * * *